United States Patent Office 3,418,352
Patented Dec. 24, 1968

3,418,352
ORGANOSILICON COMPOUNDS AND PROCESS
FOR THEIR PREPARATION
Gerd Rossmy, Essen-Werden, Germany, assignor to
Th. Goldschmidt AG, Essen, Germany
No Drawing. Filed July 22, 1964, Ser. No. 384,525
Claims priority, application Germany, July 24, 1963,
G 38,279
21 Claims. (Cl. 260—448.2)

ABSTRACT OF THE DISCLOSURE

Compounds of the formula $$R^1O[—Si(R)_x(OR^1)_{y-2}(MOSO_3X)—O]_zR^1$$

wherein R is lower alkyl;
R$^1$ is selected from the group consisting of lower alkyl and tri-lower-alkylsilyl, at least fifty percent of all R$^1$ groups consisting of said tri-lower-alkylsilyl;
M is alkylene which bridges Si and O through at least three carbon atoms;
X is selected from the group consisting of hydrogen, a metal equivalent of hydrogen and NHR$'_3$, wherein R$'$ in turn is selected from the group consisting of hydrogen, hydrocarbon and substituted hydrocarbon; and $x$, $y$ and $z$ are numbers defined by $$x=0—1;$$
$$y=2—3;$$
$$z=1—10; \text{ and}$$
$$x+y=3.$$

The application also discloses an improvement in a process of preparing polysiloxanes having sulfate groups bound to silicon through carbon, and the salts thereof, wherein silanes of the general formula

in which R is lower alkyl;
Y is selected from the group consisting of halogen and alkoxy;
M is alkylene which bridges Si and O through at least 3 carbon atoms and $y$ and $x$ are numbers defined by $y=2—3$ and $x=0—1$ and $x+y=3$, are first reacted with chlorosulfonic acid and the reaction product is subsequently subjected to hydrolysis or alcoholysis and condensation. The inventive improvement resides in that the reaction product, prior to the hydrolysis or alcoholysis and condensation, is reacted with hexaalkyl disiloxane of the formula R$_3$SiOSiR$_3$, wherein R has the above meaning, whereby R$_3$SiY is formed and removing said R$_3$SiY by distillation.

The primary utility of the novel compounds is grounded on their very pronounced surface activity. The compounds may thus be used for distribution and spreading of lacquers and varnish on surfaces.

SUMMARY OF THE INVENTION

This invention generally relates to organosilicon compounds and processes for their preparation and is particularly directed to such compounds and their preparation which are represented by the formulae

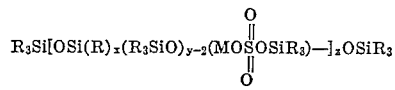

and

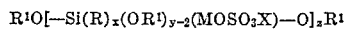

In these formulae, R stands for monovalent hydrocarbon or monovalent halogen-substituted hydrocarbon;
R$^1$ stands for trialkylsilyl and lower alkyl, at least 50% of all R$^1$ groups consisting of trialkylsilyl;
M is alkylene which bridges silicon and oxygen through at least three carbon atoms;
X is hydrogen, a metal equivalent of hydrogen or NHR$'_3$, wherein R$'$ is hydrogen, hydrocarbon or substituted hydrocarbon; and
$x$, $y$ and $z$ are numbers defined by:

$$x=0 \text{ to } 1,$$
$$y=2 \text{ to } 3, \text{ and}$$
$$z=1 \text{ to } 10.$$

French Patent 1,266,006 and U.S. Patent 3,109,012 teach procedures according to which polysiloxanes containing sulfate groups bound to silicon through carbon, or their salts, are formed by the reaction of silanes of the general formula I. 

with chlorosulfonic acid and subsequent hydrolysis or alcoholysis and condensation.
In Formula I above:
R stands for any suitable monovalent hydrocarbon group which may be halogenated;
Y stands for equal or different halogen or alkoxy substituents;
M is alkylene which bridges the silicon and the oxygen in the formula through at least three carbon atoms; while
$y$ and $x$ are numbers having a value of from 0 to 3.
In the disclosures referred to, the reaction product of the silane and the chlorosulfonic acid is equilibrated prior to the hydrolysis. The hydrolysis in this prior art procedure may also be carried out so as to neutralize the liberated acid.
It is a primary object of this invention to provide for a novel group of organosilicon compounds of great utility by subjecting the reaction products of the silane of Formula I and the chlorosulfonic acid to an intermediate procedure prior to the hydrolysis referred to and without equilibration.
Generally it is an object of this invention to improve on the art of organosilicon compounds and processes for their preparation.
Briefly, and in accordance with this invention, the reaction products of the silane of Formula I and the chlorosulfonic acid, and prior to the hydrolysis or alcoholysis and condensation, are reacted with hexaalkyldisiloxanes of the formula R$_3$Si—O—SiR$_3$, wherein R has the above-indicated meaning. During this reaction, a silane of the formula R$_3$SiY is formed wherein R and Y have the above meaning. The silane R$_3$SiY is removed from the reaction mixture by distillation. The reacton of the reacton product referred to with the hexaalkyldisiloxane thus replaces the prior art equilibration step. The omission of the equilibration step is important because a disadvantage inherent in the production of the equilibrated products is thus avoided, to wit: the end products which are obtained by hydrolysis or alcoholysis contain otherwise always a certain amount of non-organofunctionally modified organosiloxanes. This portion of non-organofunctionally modified organosiloxanes cannot be removed by distillation.
According to a preferred embodiment of the inventive process, the starting material for the inventive reaction is the reaction product of chlorosulfonic acid and a silane of the Formula I, wherein:

R is lower alkyl, preferably methyl or ethyl or a mixture of these two alkyl groups;
Y is halogen, preferably chlorine;
M is $(CH_2)_3$ or $(CH_2)_4$;
$x=0$ to 1;
$y=2$ to 3; and
$x+y=3$.

Several hexaalkyldisiloxanes may be used for the inventive reaction. The preferred hexaalkyldisiloxanes are, however, those in which alkyl stands for methyl or ethyl. Mixed hexaalkyldisiloxanes wherein some of the alkyl is methyl and the remainder is ethyl, are also suitable.

The starting product, that is the reaction product of chlorosulfonic acid and silanes of the Formula I may essentially be represented by the unit Formula II:

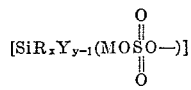

wherein the cymbols have the above-identified meanings. The compounds of Formula II are either polymeric or cyclically monomeric.

The inventive reaction between the starting compound of Formula II and the hexaalkyldisiloxane may be represented by the following reaction course:

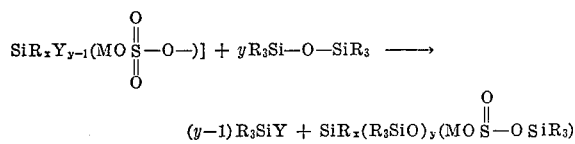

Separation of the byproduct $R_3SiY$ from the reaction mixture is best carried out by distillation through a column. Any minor amounts of the reactant hexaalkyldisiloxane which thus may also be distilled has to be replaced by corresponding fresh amounts. Generally, the reaction should be carried out with an excess of hexaalkyldisiloxane.

Once the $R_3SiY$ has been completely separated from the reaction mixture, the latter may be further heated to distill off $R_3SiOSiR_3$. This further distillation results not only in separation of excess free disiloxane, but the $R_2SiO$ groups of the reaction product proper may thus be split off under condensation of the siloxane which is organo-functionally modified with sulfate groups, to form higher siloxanes. The condensation hereinabove referred to could, for example, be represented by the following equation:

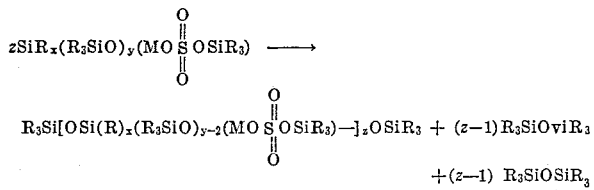

In this formula, z stands for a whole number, preferably from 2 to 10.

This condensation thus results in novel compounds of the nature previously indicated.

The inventive compounds may thereafter be subjected to hydrolysis or alcoholysis in known manner as, for example, disclosed in the two patents previously referred to. Such hydrolysis or alcoholysis carried out with organic hydroxyl compounds, preferably lower aliphatic alcohols, results in novel siloxanes, for example, di-, tri, or tetrasiloxanes. Collaterally formed trialkylalkoxysilane or hexaalkyldisiloxane can be easily separated from these novel siloxanes by distillation.

The hydrolysis or alcoholysis results essentially in a cleavage of the Si—O—S linkages under formation of Si-OH or Si-alkoxy groups. The sulfuric acid esters which are formed as the result thereof are neutralized.

Various neutralizing agents may be employed for the neutralization of the acidic sulfuric acid ester. Thus, for example, metal hydroxides, preferably alkali metal or alkaline earth metal hydroxides, ammonia, hydrazine and organic bases, preferably amines, may be employed. Of particular interest are, in many instances, amines which bear other functional groups, for example the ethanolamines and their addition products with ethylene and/or propylene oxide, as well as polyamines as, for example, diethylene triamine.

Amines which are suitable for the formation of this substituted ammonium group are, for example, primary, secondary or tertiary alkyl amines, such as methylamines, ethylamines, isopropylamines, butylamines, cyclohexylamines, cyclohexyldimethylamine, 2 - ethylhexylamine, laurylamine, aniline, dimethylaniline, alkanolamines, as for example primary, secondary and tertiary ethanolamines, propanolamines, isopropanolamines, monomethylethanolamine, dimethylethanolamine, diethylethanolamine, methyldiethanolamine, dimethylisopropylamine, diisopropylaminoethanol and dimethylaminoethanol. Also, polyamines as, for example, ethylenediamine, propylenediamine, diethylenetriamine and triethylenediamine as well as heterocyclic amines such as N-morpholine, N-alkylmorpholine and pyridine are feasible for this purpose. The ammonium group may also be present in quaternized form as, for example, in the form of tetra-alkylammonium such as tetramethylammonium or as benzyltrimethylammonium. Preferably, the amines should not contain more than 16 carbon atoms.

In a preferred embodiment of the inventive process, products are used in which the amine group is derived from an alkanol amine of the formula $$(HOY)_cNR''_{3-c}$$

wherein Y stands for ethylene, propylene or i-propylene, R'' is alkyl of preferably 1 to 4 carbon atoms and/or hydrogen, and c is a whole number between 1 and 3.

The novel compounds which are formed in the course of the neutralization can be represented by the formula III:

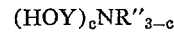

In this formula, R, M, x and y have the above-indicated meaning while $R^1$ is lower alkyl with preferably 1 to 4 carbon atoms or trialkylsilyl, at least 50% of all $R^1$ groups consisting of said trialkylsilyl. Preferred trialkylsilyl groups are trimethylsilyl and triethylsilyl;

X is hydrogen or its metal equivalent such as, for example, Na, K, 1/2 Ca, 1/3 Al, 1/4Zr or $NHR'_3$ wherein R' stands for hydrogen, a hydrocarbon group which may be substituted;

z is any suitable number between 1 and 10, preferably, however, 1 to 4, and particularly 1 to 2.

A portion of the $R_3SiO$ groups, however preferably not more than ⅓ thereof, may either be replaced by alkoxy, which is then derived from the alcohol used in the alcoholysis, or by OH groups which in turn may condense to form Si—O—Si linkages. Such groups appear inter alia in those instances where the reaction of compounds of the Formula II with hexaalkyldisiloxane does not proceed to completion.

There is valid reason of the assumption that in the reaction mixture the

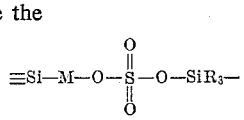

groupings are in equilibrium with

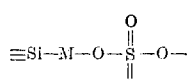

groupings (for example, in cyclic form) and hexaalkyldisiloxane. An excess amount of hexaalkyldisiloxanes thus causes that replacement of $R_3SiO$ groups by alkoxy groups in Formula III is impeded. On the other hand, by using a lesser amount of hexaalkyldisiloxane (for example, $y-1$ mole per mole of starting silane), the occurrence of alkoxy groups in the final siloxane can be intentionally increased.

A further reason for the occurrence of Si—O—R groups may also reside in the presence of $H_2SO_4$ in the chlorosulfonic acid which is used for the initial reaction with the silane of Formula I. Of course, a person skilled in the art will appreciate that unreacted

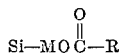

groups will be present in the inventive end products.

The inventive products have many important uses and thus may be employed for a variety of purposes. The primary utility of the inventive compounds is grounded on their very pronounced surface activity. Thus, for example, the inventive compounds may successfully be used for distribution and spreading of lacquers and varnish on surfaces. The water soluble inventive compounds may also be employed as anti-static agents and as agents for the prevention of fogging of window panes and the like glass products. Moreover, the inventive compounds are excellent wetting agents. Of particular utility are those compounds wherein X is substituted ammonium. If the alkylammonium group is derived from ethanolamine, diethanolamine or triethanolamine and the corresponding ethylene oxide and/or propylene oxide addition products of these alcohols, or are derived from the corresponding propanolamines, then the inventive siloxanes are particularly suitable as stabilizers or regulators for the cell structures of polyurethane foams. For the same purpose, siloxanes may be used which have an alkylammonium group which is derived from a polyamine. Such compounds find then also use as glass fiber finish for epoxyresin laminated products and, in this event, a partial replacement of the $R_3SiO$ groups by alkoxy groups and/or OH groups may be desirable. If the alkylammonium cation derived from unsaturated amines, for example from allyl amine, then the corresponding siloxanes are suitable as glass fiber finish for polyester lamination products.

The invention will now be described by several examples, it being understood, however, that these examples are given by way of illustration and not by way of limitation, and that many changes may be effected in choice of starting material, and process conditions in general, without affecting in any way the scope and spirit of this invention as recited in the appended claims.

EXAMPLE I

The starting material was the reaction product obtained from equivalent amounts of δ-acetoxypropylmethyldichlorosilane and freshly distilled chlorosulfonic acid. 1840 grams of this reaction product were heated with 3174 grams of hexamethyldisiloxane. The heating was carried out in a vessel fitted with a distillation column and trimethylchlorosilane was received and removed at the column head. After the temperature of the reaction mixture exceeded the boiling point of trimethylchlorosilane, the distillation was continued until a residue of 3680 grams remained in the reaction vessel. The distillate obtained in this manner was a mixture containing predominantly hexamethyldisiloxane. The residue referred to had a chlorine content of 0.05% by weight. 2000 grams of this residue were added in dropwise manner and under cooling at 20° C. to a mixture consisting of 323 grams of isopropylamine, 436 grams of ethanol and 20 grams of hydrazine sulfate (as reduction agent to prevent strong discoloration). After removal of volatile compounds by distillation at a bath temperature of 100° C. and a vacuum of 15 mm. Hg and filtration of the residue, 1998 grams of a viscous oil were obtained as final product. 1% aqueous solutions of the oil exhibited a surface tension of 22 dyn per centimeter.

Analysis of the final product yielded the following values:

|            | Percent Found | Percent Calculated (a) | Percent Calculated (b) |
|------------|---------------|------------------------|------------------------|
| Si         | 17.6          | (20.0)                 | (14.9)                 |
| C          | 37.9          | (37.2)                 | (38.4)                 |
| S          | 7.75          | (7.64)                 | (8.5)                  |
| $OC_2H_5$  | 3.9           | (0.0)                  | (12.0)                 |
| $OC_2H_5+Si/S$ | 2.96      | (3.0)                  | (3.0)                  |

The values in parentheses are the calculated values for (a) the trisiloxane

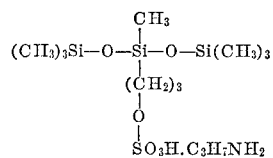

and (b) the disiloxane which is derived from (a) by replacing one $(CH_3)_3Si$ group by $C_2H_5$.

EXAMPLE II

This example is concerned with the preparation of eleven siloxanes of the formula $$R^1O—[SiR_x(OR^1)_{y-2}(MOSO_3X)—O—]_zR^1$$

wherein the various symbols have the meaning defined in the following Table 1.

Each of the compounds defined in Table 1 was individually prepared in the manner hereinafter described and the values given in the table were obtained.

1 mole of the silane of the formula

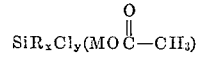

was reacted with 1 mole of chlorosulfonic acid at 60° C. and under vacuum obtained by a water jet vacuum pump. A viscous reaction product was obtained which thereafter was reacted with $y$ moles of hexamethyldisiloxane at a bath temperature of 100 to 120° C. During this reaction, trimethylchlorosilane was removed by distillation through a column having 40 bottoms or plates. The reaction product thus obtained was essentially free from chlorine. Subsequently, hexamethyldisiloxane was removed from the reaction mixture by distillation and/or was added to the reaction mixture until the $(CH_3)_3Si/S$ ratio as indicated in the table had been obtained.

The reaction mixture was then dissolved in an equal amount of methylene chloride and was added to a mixture of the alcohol $R^1OH$ and the base necessary for causing neutralization of the acid sulfate acid ester. The mixing was effected under stirring. The amount of alcohol was 3 moles of $R^1OH$ per valence of titratable acid in the reaction product. The base is derived from the cation X. The amount of base employed was 1.15 mole per valence of titratable acid in the reaction product. Amines or potassium ethylate were used as bases. After removal of volatile compounds of the formula $(CH_3)_3SiOR^1$ by distillation, the inventive compounds were obtained as highly viscous liquids. The yields in regard to

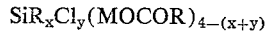

are quantitative. The constitution of the compound was confirmed by analysis. All the siloxanes thus obtained are water soluble and exhibit strong surface activity.

TABLE 1

| R | x | y | M | $(CH_3)_3Si/S$ prior to reaction with base | X | Analysis in percent by weight Si | Analysis in percent by weight S | Calculated from analytical values in mole percent Alkoxy | Calculated from analytical values in mole percent $R^1$ | Calculated from analytical values in mole percent Z |
|---|---|---|---|---|---|---|---|---|---|---|
| 1 ..... $CH_3$ | 1 | 2 | $-(CH_2)_3-$ | 3.2 | K | 18.9 | 8.8 | 1.7 | 91.5% $(CH_3)_3Si$, 8.5% $C_2H_5$ | 1.25 |
| 2 ..... $CH_3$ | 1 | 2 | $-(CH_2)_3-$ | 4.0 | Isopropylammonium | 18.3 | 7.9 | 4.1 | 81.6% $(CH_3)_3Si$, 18.4% $C_2H_5$ | 1.0 |
| 3 ..... $CH_3$ | 1 | 2 | $-(CH_2)_4-$ | 1.4 | ...do | 13.3 | 10.3 | 6.4 | 53.3% $(CH_3)_3Si$, 46.7% $C_2H_5$ | 2.1 |
| 4 ..... | 0 | 3 | $-(CH_2)_3-$ | 4.0 | ...do | 18.5 | 7.0 | 9.9 | 67.0% $(CH_3)_3Si$, 33.0% $C_2H_5$ | 1.0 |
| 5 ..... $CH_3$ | 1 | 2 | $-(CH_2)_3-$ | 3.3 | Cyclohexylammonium | 15.8 | 7.6 | 3.6 | 80.0% $(CH_3)_3Si$, 20.0% $C_2H_5$ | 1.2 |
| 6 ..... $CH_3$ | 1 | 2 | $-(CH_2)_3-$ | 3.3 | Ethanolammonium | 17.1 | 8.5 | 3.9 | 80.0% $(CH_3)_3Si$, 20.0% $C_2H_5$ | 1.2 |
| 7 ..... $CH_3$ | 1 | 2 | $-(CH_2)_3-$ | 3.0 | Triethanolammonium | 15.5 | 7.8 | 2.5 | 85.0% $(CH_3)_3Si$, 15.0% $C_2H_5$ | 1.3 |
| 8 ..... $CH_3$ | 1 | 2 | $-(CH_2)_3-$ | 3.0 | N-methylethanolammonium | 16.6 | 8.2 | 2.7 | 85.0% $(CH_3)_3Si$, 15.0% $C_2H_5$ | 1.3 |
| 9 ..... $CH_3$ | 1 | 2 | $-(CH_2)_3-$ | 1.4 | 1-aminoethylammonium | 15.3 | 9.7 | 2.0 | 84.4% $(CH_3)_3Si$, 15.6% $C_2H_5$ | 2.1 |
| 10 .... $CH_3$ | 1 | 2 | $-(CH_2)_3-$ | 0.9 | Methylammonium | 13.3 | 12.3 | 5.4 | 51.2% $(CH_3)_3Si$, 48.8% $C_2H_5$ | 4.1 |
| 11 .... $CH_3$ | 1 | 2 | $-(CH_2)_4-$ | 3.25 | Triethylammonium | 16.0 | 7.3 | 1.0 | 92.0% $(CH_3)_3Si$, 8.0% $CH_3$ | 1.2 |

While specific embodiments of the invention have been shown and described in detail to illustrate the application of the inventive principles, it will be understood that the invention may be embodied otherwise without departing from such principles.

What is claimed is:

1. Compounds of the formula $$R^1O[-Si(R)_x(OR^1)_{y-2}(MOSO_3X)-O]_zR^1$$

wherein R is lower alkyl;

$R^1$ is selected from the group consisting of lower alkyl and tri-lower-alkylsilyl, at least fifty percent of all $R^1$ groups consisting of said tri-lower-alkylsilyl;

M is alkylene which bridges Si and O through at least three carbon atoms;

X is selected from the group consisting of hydrogen, a metal equivalent of hydrogen and $NHR'_3$, wherein R' in turn is selected from the group consisting of hydrogen, hydrocarbon and substituted hydrocarbon; and x, y and z are numbers defined by $x=0-1$; $y=2-3$; $z=1-10$; and $x+y=3$.

2. Compounds as claimed in claim 1, wherein less than fifty percent of $R^1$ consists of lower alkyl of from 1–4 carbon atoms.

3. Compounds as claimed in claim 1, wherein at least fifty percent of $R^1$ stands for trimethylsilyl.

4. Compounds as claimed in claim 1, wherein at least fifty percent of $R^1$ stands for triethylsilyl.

5. Compounds as claimed in claim 1, wherein R stands for $CH_3$, M is selected from the group consisting of $(CH_2)_3$ and $(CH_2)_4$, $x=1$, $y=2$ and $z=1-4$.

6. Compounds as claimed in claim 5, wherein X is an alkalimetal.

7. Compounds as claimed in claim 5, wherein X is ammonium.

8. Compounds as claimed in claim 1, wherein R stands for $CH_3$, M is selected from the group consisting of $(CH_2)_3$ and $(CH_2)_4$, $x=1$, $y=2$ and $z=1-2$.

9. Compounds as claimed in claim 8, wherein X is an alkalimetal.

10. Compounds as claimed in claim 9, wherein X is ammonium.

11. In a process of preparing polysiloxanes having sulfate groups bound to silicon through carbon, and the salts thereof, wherein silanes of the general formula $$R_xY_ySi(MOCOR)_{4-(x+y)}$$

in which R is lower alkyl;

Y is selected from the group consisting of halogen and alkoxy;

M is alkylene which bridges Si and O through at least 3 carbon atoms and y and x are numbers defined by $y=2-3$ and $x=0-1$ and $x+y=3$, are first reacted with chlorosulfonic acid and the reaction product is subsequently subjected to hydrolysis or alcoholysis and condensation, the improvement which comprises that said reaction product prior to said hydrolysis or alcoholysis and condensation is reacted with hexaalkyl disiloxane of the formula $R_3SiOSiR_3$, wherein R has the above meaning, whereby $R_3SiY$ is formed and removing said $R_3SiY$ by distillation.

12. The improvement of claim 11, wherein Y is halogen, M is selected from the group consisting of $(CH_2)_3$ and $(CH_2)_4$, $x=0-1$, $y=2-3$ and $x+y=3$.

13. The improvement of claim 11, wherein R is methyl.

14. The improvement of claim 11, wherein R is ethyl.

15. The improvement of claim 11, wherein Y is chlorine.

16. A process of preparing compounds of the formula $$R^1O[-Si(R)_x(OR^1)_{y-2}(MOSO_3X)-O]R^1$$

wherein R is lower alkyl;

$R^1$ is selected from the group consisting of lower alkyl and tri-lower-alkylsilyl, at least fifty percent of all $R^1$ groups consisting of said tri-lower-alkylsilyl;

M is alkylene which bridges Si and O through at least three carbon atoms;

X is selected from the group consisting of hydrogen, a metal equivalent of hydrogen and $NHR'_3$, wherein R' in turn is selected from the group consisting of hydrogen, hydrocarbon and substituted hydrocarbon; and x, y and z are numbers defined by $x=0-1$; $y=2-3$; $z=1-10$; and $x+y=3$.

which comprises reacting compounds of the unit formula $$[SiR_xY_{y-1}(MO\overset{O}{\underset{O}{\overset{\|}{S}}}O-)]$$

wherein Y is selected from the group consisting of halogen and alkoxy and the remaining symbols have the above meaning, with hexaalkyldisiloxane of the formula $R_3Si-O-SiR_3$, wherein R has the above meaning according to the formula $$[SiR_xY_{y-1}(MO\overset{O}{\underset{O}{\overset{\|}{S}}}O-)] + yR_3Si-O-SiR_3 \longrightarrow$$
$$(y-1)R_3SiY + SiR_x(R_3SiO)_y(MO\overset{O}{\underset{O}{\overset{\|}{S}}}-OSiR_3)$$

removing the $R_3SiY$ by distillation and subjecting the residue to the action of an organic OH-compound.

17. A process as claimed in claim 16, wherein the OH-compound is a lower aliphatic alcohol.

18. A process as claimed in claim 16, wherein the reaction product is neutralized.

19. Compounds of the formula $$R_3Si[OSi(R)_x(R_3SiO)_{y-2}(MO\overset{O}{\underset{O}{\overset{\|}{S}}}OSiR_3)-]_zOSiR_3$$

wherein R is lower alkyl,

M is alkylene which bridges Si and O through at least carbon atoms, $x=0-1$; $y=2-3$; $z=1-10$; and $x+y=3$.

20. A compound as in claim 19, wherein R is methyl and M is $(CH_2)_3$.

21. A compound as in claim 19, wherein R is methyl and M is $(CH_2)_4$.

References Cited

UNITED STATES PATENTS 3,109,012  10/1963  Rossmy et al. ____ 260—448.2

FOREIGN PATENTS 1,157,789  6/1959  Germany.

OTHER REFERENCES

Eaborn, C., "Organosilicon Compounds," p. 267.

TOBIAS E. LEVOW, *Primary Examiner.*

J. PODGORSKI, *Assistant Examiner.*

U.S. Cl. X.R.

260—448.8; 117—64, 124